United States Patent [19]
Min

[11] Patent Number: 5,833,298
[45] Date of Patent: Nov. 10, 1998

[54] TILTABLE FULL VISION AUTOMOBILE WINDSHIELD

[76] Inventor: Aung Min, 16/4 U Wisara Ward, Dagon P.O. Yangon, Myanmar, Myanmar

[21] Appl. No.: 625,577
[22] Filed: Mar. 28, 1996
[51] Int. Cl.⁶ .................................................. B60J 1/02
[52] U.S. Cl. .................................. 296/96.13; 296/96.2
[58] Field of Search ........................... 296/90, 92, 96.12, 296/96.13, 96.2

[56] References Cited

U.S. PATENT DOCUMENTS

| 2,355,264 | 8/1944 | Bloomfield | 296/96.13 |
| 2,464,696 | 3/1949 | Lelong | 296/96.13 X |
| 3,031,223 | 4/1962 | Koplin | 296/96.13 X |
| 3,158,395 | 11/1964 | Smith | 296/96.13 X |

FOREIGN PATENT DOCUMENTS

| 561376 | 5/1960 | Belgium | 296/96.13 |
| 55-114617 | 9/1980 | Japan | 296/96.12 |
| 58-194622 | 11/1983 | Japan | 296/99.1 |

*Primary Examiner*—Joseph D. Pape

[57] ABSTRACT

A tiltable full vision automobile windshield that includes an automobile, a windshield portion, and pivoting apparatus. The automobile has an exterior width, a passenger compartment with an interior width, a cowl, a roof with a cross mid-pillar, and a pair of front doors with movable windows. Each of the pair of front doors of the automobile has a length, a closed position and an open position. The movable windows of the pair of front doors have a closed position and an open position. The windshield portion is pivotally mounted to the cowl of the automobile and has a closed position and an open position. The pivoting apparatus pivotally mounts the windshield portion to the cowl of the automobile.

18 Claims, 1 Drawing Sheet

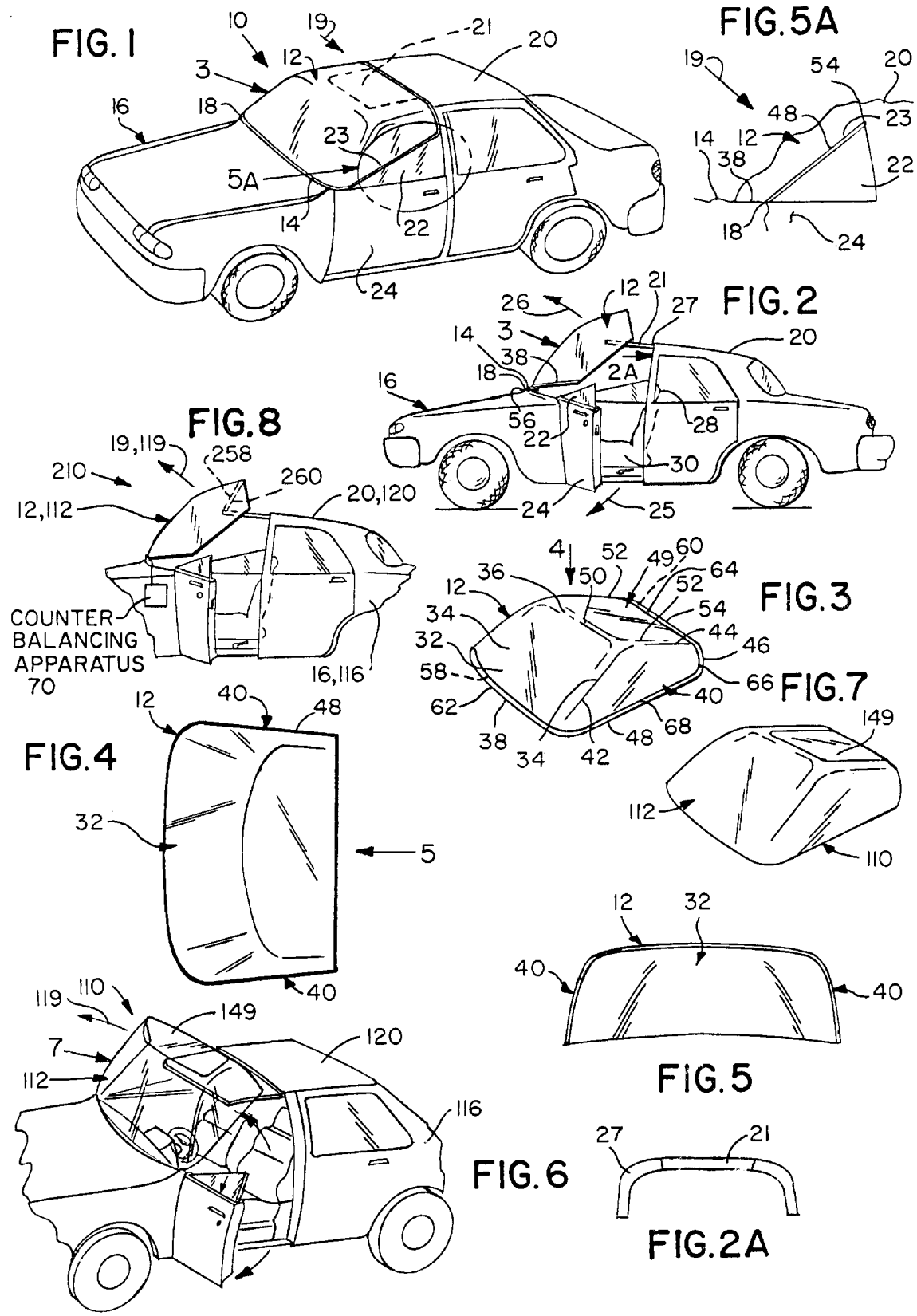

TILTABLE FULL VISION AUTOMOBILE WINDSHIELD

BACKGROUND OF THE INVENTION

The present invention relates to a tiltable full vision automobile windshield. More particularly, the present invention relates to a tiltable full vision automobile windshield that includes an automobile, a windshield portion pivotally mounted to the cowl of the automobile, and apparatus for pivoting upwardly the windshield portion.

In modern automobile body design, emphasis has been increasingly directed towards features of large expanses of glass and smoothly curved surfaces. This being dictated by the requirements to obtain favorable airflow for improved aerodynamic efficiencies and to provide aesthetically pleasant forms.

Some body designs feature side windows having two portions. The first portion being fixed adjacent to the roof and the front pillars and sharply curved. The second portion being slightly curved and movable for raising and lowering.

The front pillars that frame the two sides of the windshield are made as slim as possible both for the improvement of appearance and for safer driving deriving from improved visibility.

Numerous innovations for automobile visibility devices have been provided in the prior art that will be described. However, even though these innovations may be suitable for the specific individual purposes to which they address, they differ from the present invention in that they do not teach tiltable full vision automobile windshield that includes an automobile, a windshield portion pivotally mounted to the cowl of the automobile, and apparatus for pivoting upwardly the windshield portion.

FOR EXAMPLE, U.S. Pat. No. 4,018,474 to Kajio et al. teaches an automobile pillar that includes of three sheet-formed members. Each of the three sheet-formed members is bent lengthwise to form a central crease, assembled back to back, and in close contact with each other.

ANOTHER EXAMPLE, U.S. Pat. No. 4,988,142 to Chandler et al. teaches an automobile arcuate-shaped transparent door window frame that includes a lower end fixedly mounted on the door lower portion and extending upwardly along the pillar and along the roof to define a structurally rigid upper portion of the door closing the space between the transparent window panel and the roof and the pillar.

STILL ANOTHER EXAMPLE, U.S. Pat. No. 5,009,463 to Saitoh et al. teaches an automobile body that includes a canopy of plastic having a pair of thicker portions projecting on an inner surface of the canopy and spaced from each other in the fore-and-aft direction of the automobile body. A rigid support member is embedded in each of the thicker portions.

YET ANOTHER EXAMPLE, U.S. Pat. No. 5,188,419 to Liethen teaches an automobile light improvement device that includes a window located above the windshield and a header extending from the bottom part of the window into the vehicle cab.

FINALLY, STILL YET ANOTHER EXAMPLE, U.S. Pat. No. 5,209,542 to Yoshizawa teaches an automobile windshield device that includes a glass sheet having a S-shaped vertical cross section. The windshield device further includes an automobile body having a window frame and a windshield fixed to the window frame.

It is apparent that numerous innovations for automobile visibility devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a tiltable full vision automobile windshield that avoids the disadvantages of the prior art.

ANOTHER OBJECT of the present invention is to provide a tiltable full vision automobile windshield that is simple and inexpensive to manufacture.

STILL ANOTHER OBJECT of the present invention is to provide a tiltable full vision automobile windshield that is simple to use.

YET ANOTHER OBJECT of the present invention is to provide a tiltable full vision automobile windshield that eliminates the requirement for the two front pillars or posts, so that full vision to the front for the vehicle is provided.

STILL YET ANOTHER OBJECT of the present invention is to provide a tiltable full vision automobile windshield wherein the two front side doors have their movable window glasses occupying the remaining lower portion of the side window area of the windshield.

YET STILL ANOTHER OBJECT of the present invention is to provide a tiltable full vision automobile windshield that produces a well rounded, smooth, aerodynamically efficient and aesthetically pleasant looking vehicle body.

STILL YET ANOTHER OBJECT of the present invention is to provide a tiltable full vision automobile windshield wherein the front doors are constructed with thinner widths due to the smaller area and less curvature of the side window glasses, so that an increase in passenger compartment width within the same vehicle width is provided.

BRIEFLY STATED, YET STILL ANOTHER OBJECT of the present invention is to provide a tiltable full vision automobile windshield that includes an automobile, a windshield portion, and pivoting apparatus.

STILL YET ANOTHER OBJECT of the present invention is to provide a tiltable full vision automobile windshield wherein the automobile has an exterior width, a passenger compartment with an interior width, a cowl, a roof with a cross mid-pillar, and a pair of front doors with movable windows.

YET STILL ANOTHER OBJECT of the present invention is to provide a tiltable full vision automobile windshield wherein each of the pair of front doors of the automobile has a length, a closed position and an open position.

STILL YET ANOTHER OBJECT of the present invention is to provide a tiltable full vision automobile windshield wherein the movable windows of the pair of front doors have a closed position and an open position.

YET STILL ANOTHER OBJECT of the present invention is to provide a tiltable full vision automobile windshield wherein the windshield portion is pivotally mounted to the cowl of the automobile and has a closed position and an open position.

STILL YET ANOTHER OBJECT of the present invention is to provide a tiltable full vision automobile windshield wherein the pivoting apparatus pivotally mounts the windshield portion to the cowl of the automobile.

STILL YET ANOTHER OBJECT of the present invention is to provide a tiltable full vision automobile windshield wherein the windshield portion is a one piece transparent material.

YET STILL ANOTHER OBJECT of the present invention is to provide a tiltable full vision automobile windshield wherein the one piece transparent material of the windshield portion is selected from the group consisting of laminated glass and plastic.

STILL YET ANOTHER OBJECT of the present invention is to provide a tiltable full vision automobile windshield wherein the laminated glass is two sheets of glass that has sandwiched therebetween a material selected from the group consisting of plasticized polyvinyl butyryl and polyurethane sheeting.

YET STILL ANOTHER OBJECT of the present invention is to provide a tiltable full vision automobile windshield wherein the plastic is a liquid phase plastic material monomer diethylene glycol biallyl carbonate that is poured into a mold and then heated until polymerization and set.

STILL YET ANOTHER OBJECT of the present invention is to provide a tiltable full vision automobile windshield wherein the windshield portion includes a laterally curved and vertically rearwardly slanted front part with a pair of vertically rearwardly slanted and vertically inwardly slanted side edges, a laterally curved top edge, and a laterally curved bottom edge.

YET STILL ANOTHER OBJECT of the present invention is to provide a tiltable full vision automobile windshield wherein the windshield portion further includes a pair of longitudinally curved and vertically inwardly slanted side parts.

STILL YET ANOTHER OBJECT of the present invention is to provide a tiltable full vision automobile windshield wherein each of the pair of longitudinally curved and vertically inwardly slanted side parts of the windshield portion has a vertically rearwardly slanted and vertically inwardly slanted front edge, a downwardly slanted top edge, a vertically inwardly slanted back edge, and an upwardly slanted bottom edge.

YET STILL ANOTHER OBJECT of the present invention is to provide a tiltable full vision automobile windshield wherein each of the pair of longitudinally curved and vertically inwardly slanted side parts of the windshield portion extends rearwardly at the vertically rearwardly slanted and vertically inwardly slanted front edge of the pair of longitudinally curved and vertically inwardly slanted side parts of the windshield portion from a respective one of the pair of vertically rearwardly slanted and vertically inwardly slanted side edges of the laterally curved and vertically rearwardly slanted front part of the windshield portion to a distance equivalent to the length of each of the pair of front doors of the automobile.

STILL YET ANOTHER OBJECT of the present invention is to provide a tiltable full vision automobile windshield wherein the area where the vertically rearwardly slanted and vertically inwardly slanted front edge of each of the pair of longitudinally curved and vertically inwardly slanted side parts of the windshield portion meets the respective one of the pair of vertically rearwardly slanted and vertically inwardly slanted side edges of the front part of the windshield portion is a smoothly curved bend, so that the need for vision obstructing conventional automotive front corner pillars is eliminated since the smoothly curved bend is transparent and in itself is a reinforcement and provides roundness to the automobile for increased aerodynamic characteristics and pleasing aesthetics.

YET STILL ANOTHER OBJECT of the present invention is to provide a tiltable full vision automobile windshield wherein the windshield portion further includes a longitudinally curved roof part.

STILL YET ANOTHER OBJECT of the present invention is to provide a tiltable full vision automobile windshield wherein the longitudinally curved roof part of the windshield portion has a laterally curved front edge, a pair of downwardly slanted side edges, and a back edge.

YET STILL ANOTHER OBJECT of the present invention is to provide a tiltable full vision automobile windshield wherein the longitudinally curved roof part of the windshield portion extends rearwardly at the laterally curved front edge of the longitudinally curved roof part of the windshield portion from the laterally curved top edge of the laterally curved and vertically rearwardly slanted front part of the windshield portion, the area where the laterally curved front edge of the longitudinally curved roof part of the windshield portion meets the laterally curved top edge of the laterally curved and vertically rearwardly slanted front part of the windshield portion is a smoothly curved bend, so that the need for a vision obstructing conventional automotive upper front reinforcement bar is eliminated since the smoothly curved bend is transparent and in itself is a reinforcement and provides roundness to the automobile for increased aerodynamic characteristics and pleasing aesthetics.

STILL YET ANOTHER OBJECT of the present invention is to provide a tiltable full vision automobile windshield wherein the longitudinally curved roof part of the windshield portion further extends sidewardly at each of the pair of downwardly slanted side edges of the longitudinally curved roof part of the windshield portion to a respective downwardly slanted top edge of the pair of longitudinally curved and vertically inwardly slanted side parts of the windshield portion.

YET STILL ANOTHER OBJECT of the present invention is to provide a tiltable full vision automobile windshield wherein the area where each of the pair of downwardly slanted side edges of the longitudinally curved roof part of the windshield portion meets the respective downwardly slanted top edge of the pair of longitudinally curved and vertically inwardly slanted side parts of the windshield portion is a smoothly curved bend, so that the need for a vision obstructing conventional automotive upper side reinforcement bars is eliminated since the smoothly curved bend is transparent and in itself is a reinforcement and provides roundness to the automobile for increased aerodynamic characteristics and pleasing aesthetics.

STILL YET ANOTHER OBJECT of the present invention is to provide a tiltable full vision automobile windshield that further includes reinforcement apparatus disposed at both the laterally curved bottom edge of the laterally curved and vertically rearwardly slanted front part of the windshield portion and at the back edge of the longitudinally curved roof part of the windshield portion, so that a rigid structural unit is provided.

YET STILL ANOTHER OBJECT of the present invention is to provide a tiltable full vision automobile windshield that further includes decorative molding disposed on the reinforcement apparatus that are disposed at the laterally curved bottom edge of the laterally curved and vertically rearwardly slanted front part of the windshield portion and at the back edge of the longitudinally curved roof part of the windshield portion, so that the reinforcement apparatus is decoratively hidden.

STILL YET ANOTHER OBJECT of the present invention is to provide a tiltable full vision automobile windshield that further includes thin decorative molding disposed on the vertically inwardly slanted back edge of the pair of longitudinally curved and vertically inwardly slanted side parts of the windshield portion and thin transparent molding disposed on the upwardly slanted bottom edge of each of the pair of longitudinally curved and vertically inwardly slanted side parts of the windshield portion, so that vision is not obstructed.

YET STILL ANOTHER OBJECT of the present invention is to provide a tiltable full vision automobile windshield wherein each of the movable windows of the pair of front doors of the automobile is triangular-shaped and has a vertically rearwardly slanted and vertically inwardly slanted front edge.

STILL YET ANOTHER OBJECT of the present invention is to provide a tiltable full vision automobile windshield wherein when the windshield portion is in the closed position and when the triangular-shaped movable windows of the pair of front doors of the automobile are in the closed position and when the pair of front doors of the automobile are in the closed position each vertically rearwardly slanted and vertically inwardly slanted front edge of the triangular-shaped movable windows of the pair of front doors of the automobile meet a respective upwardly slanted bottom edge of the pair of longitudinally curved and vertically inwardly slanted side parts of the windshield portion, so that a full side vision area is provided.

STILL YET ANOTHER OBJECT of the present invention is to provide a tiltable full vision automobile windshield wherein the pivoting apparatus includes hinges that are mounted to the reinforcement apparatus that is disposed at the laterally curved bottom edge of the laterally curved and vertically rearwardly slanted front part of the windshield portion and to the cowl of the automobile.

YET STILL ANOTHER OBJECT of the present invention is to provide a tiltable full vision automobile windshield wherein when the windshield portion is in the open position the windshield portion pivots upwardly about the hinges in the range of 25 to 35 degrees to a point where the upwardly slanted bottom edge of the pair of longitudinally curved and vertically inwardly slanted side parts of the windshield portion reach the position where the eliminated vision obstructing conventional automotive front corner pillars would have been, so that sufficient space is provided for entering and leaving the automobile.

STILL YET ANOTHER OBJECT of the present invention is to provide a tiltable full vision automobile windshield wherein the pivoting apparatus further includes counterbalancing means, so that the windshield portion is pivoted more easily and is prevented from unintentional movement.

YET STILL ANOTHER OBJECT of the present invention is to provide a tiltable full vision automobile windshield that further includes an extension that extends horizontally forwardly from the cross mid-pillar of the roof of the automobile towards the laterally curved and vertically rearwardly slanted front part of the windshield portion, so that when the windshield portion is in the closed position the longitudinally curved roof part of the windshield portion rests on the extension and provides a rigid reinforcement to further improve safety characteristics.

STILL YET ANOTHER OBJECT of the present invention is to provide a tiltable full vision automobile windshield wherein the longitudinally curved roof part of the windshield portion is separate from the windshield portion and is selected from the group consisting of glass, plastic, sheet metal, a sun roof, and the extension.

YET STILL ANOTHER OBJECT of the present invention is to provide a tiltable full vision automobile windshield that further includes weather protection apparatus for protecting a user during inclement weather when said windshield portion is achieving said open position.

STILL YET ANOTHER OBJECT of the present invention is to provide a tiltable full vision automobile windshield wherein the weather protection apparatus covers the space between the roof portion of the automobile and the windshield portion.

FINALLY, YET STILL ANOTHER OBJECT of the present invention is to provide a tiltable full vision automobile windshield wherein the weather protection apparatus includes a sliding roof member which is slidably mounted in the roof portion of the automobile and is extendable therefrom as the windshield portion is achieving the open position and retractable therein as the windshield portion is achieving the closed position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of a preferred embodiment of the present invention with the windshield portion in the closed position;

FIG. 2 is a diagrammatic side elevational view of the preferred embodiment of the present invention with the windshield in the open position;

FIG. 2A is a diagrammatic front elevational view with parts broken away of the cross mid-pillar taken generally in the direction of arrow 2A in FIG. 2;

FIG. 3 is a diagrammatic perspective view of the windshield portion of the preferred embodiment of the present invention taken in the direction of arrow 3 in both FIGS. 1 and 2;

FIG. 4 is a top plan view of the windshield of the preferred embodiment of the present invention taken in the direction of arrow 4 in FIG. 3;

FIG. 5 is a rear elevational view of the windshield of the preferred embodiment of the present invention taken in the direction of arrow 5 in FIG. 4;

FIG. 5A is a diagrammatic side elevational view, with parts broken away, of the area encircled by the broken circle identified by arrow 5A in FIG. 1;

FIG. 6 is a diagrammatic perspective view of a first alternate embodiment of the present invention with the windshield in the open position;

FIG. 7 is a diagrammatic perspective view of the windshield portion of the first alternate embodiment of the present invention taken in the direction of arrow 7 in FIG. 6; and FIG. 8 is a diagrammatic side elevational view of the second alternated embodiment of the present invention with the windshield in the open position.

LIST OF REFERENCE NUMERALS UTILIZED IN THE DRAWING

Preferred Embodiment 10 tiltable full vision automobile windshield of the present invention 12 windshield portion
14 automobile cowl
16 automobile
18 windshield portion pivot point
19 windshield portion closed position
20 automobile roof portion
21 automobile roof portion extension
22 automobile front door triangular-shaped windows
23 front door window vertically rearwardly slanted and vertically inwardly slanted front edge
24 automobile front doors
25 automobile front door open position
26 windshield open position
27 automobile roof portion cross mid-pillar
28 automobile front seat tops
30 automobile front seats
32 windshield portion transparent laterally curved and vertically rearwardly slanted front part
34 pair of windshield portion front part vertically rearwardly slanted and vertically inwardly slanted side edges
36 windshield portion front part laterally curved top edge
38 windshield portion front part laterally curved bottom edge
40 pair of windshield portion transparent longitudinally curved and vertically inwardly slanted side parts
42 windshield portion side part vertically rearwardly slanted and vertically inwardly slanted front edge
44 windshield portion side part downwardly slanted top edge
46 windshield portion side part vertically inwardly slanted back edge
48 windshield portion side part upwardly slanted bottom edge
49 windshield portion transparent longitudinally curved roof part
50 windshield portion roof part laterally curved front edge
52 pair of windshield portion roof part downwardly slanted side edges
54 windshield portion roof part back edge
56 windshield portion front part bottom edge hinges
58 reinforcement
60 reinforcement
62 decorative molding
64 decorative molding
66 thin decorative molding
68 thin decorative molding
70 counterbalancing apparatus First Alternate Embodiment 110 tiltable full vision automobile windshield of the present invention
112 windshield portion
116 automobile
119 windshield portion open position
120 automobile roof portion
149 separate windshield portion longitudinally curved roof part Second Alternate Embodiment 210 tiltable full vision automobile windshield of the present invention
258 weather protection means
260 sliding roof member

DETAILED DESCRIPTION OF THE PREFERRED EMBODIMENT

Referring now to the figures in which like numerals indicate like parts, and particularly to FIG. 1, the tiltable full vision automobile windshield of the present invention is shown generally at 10 with a windshield portion 12 pivoted downwardly from an automobile cowl 14 of an automobile 16 at a windshield portion pivot point 18 and achieving a windshield portion closed position 19.

When the windshield portion 12 is in the windshield portion closed position 19, the windshield portion 12 rests against an automobile roof portion extension 21 of an automobile roof portion 20 of the automobile 16 and rests also against automobile front door triangular-shaped windows 22 of automobile front doors 24 that are in an automobile front door closed position.

The front door triangular-shaped windows 22 of the automobile front doors 24 are movable glass which can be raised to a closed position and lowered to an opened position. Each of the front door triangular-shaped windows 22 of the automobile front doors 24 has a front door window vertically rearwardly slanted and vertically inwardly slanted front edge 23.

The tiltable full vision automobile windshield 10 is shown in FIG. 2 with the windshield portion 12 pivoted upwardly from the automobile cowl 14 of the automobile 16 at the windshield portion pivot point 18 and achieving a windshield open position 26.

When the windshield portion 12 is in the windshield open position 26, the windshield portion 12 is displaced a distance from the automobile roof portion 20 of the automobile 16 and is displaced a distance from the automobile front door triangular-shaped windows 22 of the automobile front doors 24 when the automobile front doors 24 are in an automobile front door open position 25.

The configuration of the preferred embodiment of the tiltable full vision automobile windshield 10 can best be seen in FIGS. 3–5, and as such, will be discussed with reference thereto.

The windshield portion 12 is one piece with integrally formed parts and is a transparent laminated glass that has a thermoplastic interlayer, such as a plasticized polyvinyl butyryl or polyurethane sheeting sandwiched between two sheets of glass. The windshield portion 12 may also be a plastic material, such as liquid phase plastic material monomer diethylene glycol biallyl carbonate that is poured into a mold and then heated until polymerization and set.

The windshield portion 12 includes a windshield portion transparent laterally curved and vertically rearwardly slanted front part 32 that is smooth with a slightly curved surface, a pair of windshield portion front part vertically rearwardly slanted and vertically inwardly slanted side edges 34, a windshield portion front part laterally curved top edge 36, and a windshield portion front part laterally curved bottom edge 38.

The windshield portion 12 further includes a pair of windshield portion transparent longitudinally curved and vertically inwardly slanted side parts 40. Each of the pair of windshield portion transparent longitudinally curved and vertically inwardly slanted side parts 40 of the windshield portion 12 has a windshield portion side part vertically rearwardly slanted and vertically inwardly slanted front edge 42, a windshield portion side part downwardly slanted top edge 44, a windshield portion side part vertically inwardly slanted back edge 46, and a windshield portion side part upwardly slanted bottom edge 48.

Each of the pair of windshield portion transparent longitudinally curved and vertically inwardly slanted side parts 40 of the windshield portion 12 extends rearwardly at the windshield portion side part vertically rearwardly slanted and vertically inwardly slanted front edge 42 of the pair of windshield portion transparent longitudinally curved and vertically inwardly slanted side parts 40 of the windshield portion 12 from a respective one of the pair of windshield portion front part vertically rearwardly slanted and vertically inwardly slanted side edges 34 of the windshield portion transparent laterally curved and vertically rearwardly slanted front part 32 of the windshield portion 12 to the rear edge of a respective one of the automobile front doors 24.

With such a configuration, the area where the windshield portion side part vertically rearwardly slanted and vertically inwardly slanted front edge 42 of each of the pair of windshield portion transparent longitudinally curved and vertically inwardly slanted side parts 40 of the windshield portion 12 meets the respective one of the pair of windshield portion front part vertically rearwardly slanted and inwardly slanted side edges 34 of the windshield portion transparent laterally curved and vertically rearwardly slanted front part 32 is a smoothly curved bend whose presence eliminates the need for the vision obstructing conventional automotive front corner pillars since the smoothly curved bend is transparent and in itself is a reinforcement while providing roundness to the automobile 16 for increased aerodynamic characteristics and pleasing aesthetics.

The windshield portion side part vertically inwardly slanted back edge 46 of the pair of windshield portion transparent longitudinally curved and vertically inwardly slanted side parts 40 of the windshield portion 12 meets an automobile conventional mid pillar at a point just above the shoulder of a driver using the automobile 16, so that the driver has a full unobstructed view to both the front and the sides. The automobile conventional mid pillar is strengthened and reinforced, so that a sufficiently safe structure is provided.

The pair of windshield portion transparent longitudinally curved and vertically inwardly slanted side parts 40 of the windshield portion 12 replaces a part of the conventional automotive front door side windows, so that the front door triangular-shaped windows 22 of the automobile front doors 24 can maintain their small size.

It is to be understood that the windshield portion side part upwardly slanted bottom edge 48 of the pair of windshield portion transparent longitudinally curved and vertically inwardly slanted side parts 40 of the windshield portion 12 may be straight or curved, but is not limited to that.

The windshield portion 12 further includes a windshield portion transparent longitudinally curved roof part 49. The windshield portion transparent longitudinally curved roof part 49 of the windshield portion 12 has a windshield portion roof part laterally curved front edge 50, a pair of windshield portion roof part downwardly slanted side edges 52, and a windshield portion roof part back edge 54.

The windshield portion transparent longitudinally curved roof part 49 of the windshield portion 12 extends rearwardly at the windshield portion roof part laterally curved front edge 50 of the windshield portion transparent longitudinally curved roof part 49 of the windshield portion 12 from the windshield portion front part laterally curved top edge 36 of the windshield portion transparent laterally curved and vertically rearwardly slanted front part 32 of the windshield portion 12.

With such a configuration, the area where the windshield portion roof part laterally curved front edge 50 of the windshield portion transparent longitudinally curved roof part 49 of the windshield portion 12 meets the windshield portion front part curved top edge 36 of the windshield portion transparent laterally curved and vertically rearwardly slanted front part 32 of the windshield portion 12 is a smoothly curved bend whose presence eliminates the need for the vision obstructing conventional automotive upper front reinforcement bar since the smoothly curved bend is transparent and in itself is a reinforcement while providing roundness to the automobile 16 for increased aerodynamic characteristics and pleasing aesthetics.

The windshield portion transparent longitudinally curved roof part 49 of the windshield portion 12 further extends sidewardly at each of the pair of windshield portion roof part downwardly slanted side edges 52 of the windshield portion transparent longitudinally curved roof part 49 of the windshield portion 12 to a respective windshield portion side part downwardly slanted top edge 44 of the pair of windshield portion transparent longitudinally curved and vertically inwardly slanted side parts 40 of the windshield portion 12.

With such a configuration, the area where each of the pair of windshield portion roof part downwardly slanted side edges 52 of the windshield portion transparent longitudinally curved roof part 49 of the windshield portion 12 meets a respective windshield portion side part downwardly slanted top edge 44 of the pair of windshield portion transparent longitudinally curved and vertically inwardly slanted side parts 40 of the windshield portion 12 is a smoothly curved bend whose presence eliminates the need for the vision obstructing conventional automotive upper side reinforcement bars since the smoothly curved bend is transparent and in itself is a reinforcement while providing roundness to the automobile 16 for increased aerodynamic characteristics and pleasing aesthetics.

The windshield portion 12 is a structurally rigid unit that is further reinforced at both the windshield portion front part laterally curved bottom edge 38 of the windshield portion transparent laterally curved and vertically rearwardly slanted front part 32 of the windshield portion 12 and at the windshield portion roof part back edge 54 of the windshield portion transparent longitudinally curved roof part 49 of the windshield portion 12.

The reinforcements 58,60 at the windshield portion front part laterally curved bottom edge 38 of the windshield portion transparent slanted front part 32 of the windshield portion 12 and at the windshield portion roof part back edge 54 of the windshield portion transparent longitudinally curved roof part 49 of the windshield portion 12, respectively, are aesthetically hidden by decorative moldings 62, 64 respectively.

Thin decorative moldings 66,68 are provided for aesthetic purposes on both the windshield portion side part vertically inwardly slanted back edge 46 of the pair of windshield portion transparent longitudinally curved and vertically inwardly slanted side parts 40 of the windshield portion 12 and on the windshield portion side part upwardly slanted bottom edge 48 of the pair of windshield portion transparent longitudinally curved and vertically inwardly slanted side parts 40 of the windshield portion 12, respectively.

It is to be understood, however, that the thin decorative molding 68 provided on the windshield portion side part upwardly slanted bottom edge 48 of the pair of windshield portion transparent longitudinally curved and vertically inwardly slanted side parts 40 of the windshield portion 12 are transparent, so that side vision is not obstructed.

As shown in FIG. 2, the means for pivoting the windshield portion 12 about the automobile cowl 14 of the automobile 16 at the windshield portion pivot point 18 includes windshield portion front part bottom edge hinges 56 that are mounted to the reinforcement at the windshield portion front part laterally curved bottom edge 38 of the windshield portion transparent laterally curved and vertically rearwardly slanted front part 32 of the windshield portion 12 and to the automobile cowl 14 of the automobile 16.

The means for pivoting the windshield portion 12 about the automobile cowl 14 of the automobile 16 at the windshield portion pivot point 18 may include, but is not limited to, manual, mechanical, hydraulic, or electrical, and may be provided by means auxiliary to the automobile 16 or may be provided by means already present in the automobile or a combination thereof and further may be located at either the windshield portion roof part back edge 54 of the windshield portion transparent longitudinally curved roof part 49 of the windshield portion 12 or at the windshield portion front part bottom edge hinges 56, but is not limited to that.

Manual override pivoting means (not shown) is provided, so that if the automatic pivoting means fail, the windshield portion 12 can be operated manually.

The weight of the windshield portion 12 is counterbalanced by counterbalancing apparatus 70 (see FIG. 8), so that the windshield portion 12 can be tilted more easily and prevented from unintentional movement. The counterbalancing apparatus 70 can be, but is not limited to, weights, spring mechanism, hydraulic mechanism, torsional mechanism, or the like.

To enable a driver and a front passenger to enter and leave the automobile 16, the windshield portion 12 pivots upwardly about the windshield portion front part bottom edge hinges 56 to a point where the windshield portion side part upwardly slanted bottom edge 48 of the pair of windshield portion transparent longitudinally curved and vertically inwardly slanted side parts 40 of the windshield portion 12 reach the position where the eliminated front pillars on a conventional automobile would have been, so that sufficient space is provided for entering and leaving automobile front seats 30.

Since the windshield portion side part upwardly slanted bottom edge 48 of the pair of windshield portion longitudinally curved and vertically inwardly slanted side parts 40 of the windshield portion 12 is inclined, the windshield portion 12 needs only about 25 to 35 degrees of rotation to achieve the windshield portion open position 19.

As shown in FIG. 5A, the windshield portion front part laterally curved bottom edge 38 of the windshield portion transparent laterally curved and vertically rearwardly slanted front part 32 of the windshield portion 12 is positioned on the automobile cowl 14 of the automobile 16 from which it pivots.

When the front door triangular-shaped windows 22 of the automobile front doors 24 are in the closed position and the windshield portion 12 is in the windshield portion closed position 19, the front door triangular-shaped window vertically rearwardly slanted and vertically inwardly slanted front edge 23 of each of the front door triangular-shaped windows 22 of the automobile front doors 24 meet a respective windshield portion side part upwardly slanted bottom edge 48 of the pair of windshield portion transparent longitudinally curved and vertically inwardly slanted side parts 40 of the windshield portion 12, so that a full side vision area is provided.

When the windshield portion 12 is in the windshield portion closed position 19, the windshield portion roof part back edge 54 of the windshield portion transparent longitudinally curved roof part 49 of the windshield portion 12 meets the automobile roof portion 20 of the automobile 16.

The automobile roof portion extension 21 of the automobile roof portion 20 of the automobile 16 is optional and provides a rigid reinforcement that protrudes horizontally from an automobile roof portion cross mid-pillar 27 (see FIG. 2A) of the roof portion 20 of the automobile 16 and over automobile front seat tops 28 of the automobile front seats 30, so that safety characteristics are further improved.

The configuration and operation of a first alternate embodiment of the tiltable full vision automobile windshield 110 can best be seen in FIGS. 6 and 7, and as such, will be discussed with reference thereto.

The configuration and operation of the tiltable full vision automobile windshield 110 is identical to that of the tiltable full vision automobile windshield 10, except for the configuration of a separate windshield portion longitudinally curved roof part 149 of a windshield portion 112.

The separate windshield portion longitudinally curved roof part 149 of the windshield portion 112 is a part separate from, and is flush at the area where it mounts to, the remaining integrally formed parts of the windshield portion 112, which is unlike the windshield portion 12 in which all the parts are integrally formed.

The separate windshield portion longitudinally curved roof part 149 of the windshield portion 112 can be made of glass, plastic or sheet metal, but is not limited to that.

It is to be understood that the separate windshield portion longitudinally curved roof part 149 of the windshield portion 112 can be a sun roof or can be eliminated completely wherein the automobile roof portion extension 21 of the automobile roof portion 20 of the automobile 16 will function as the separate windshield portion longitudinally curved roof part 149 of the windshield portion 112.

The configuration and operation of a second alternate embodiment of the tiltable full vision automobile windshield 210 can best be seen in FIG. 8, and as such, will be discussed with reference thereto.

The second alternate embodiment of the tiltable full vision automobile windshield 210 can be used with either the windshield portion 12 of the tiltable full vision automobile windshield 10 or with the windshield portion 112 of the tiltable full vision automobile windshield 110.

The second alternate embodiment of the tiltable full vision automobile windshield 210 includes weather protection means 258 that protect the driver during inclement weather when the windshield portion 12 is in the windshield open position 19 and when the windshield portion 112 is in a windshield open position 119, respectively.

The weather protection means 258 covers the space between the automobile roof portion 20 of the automobile 16 and the windshield portion 12 and covers the space between an automobile roof portion 120 of an automobile 116 and the windshield portion 112, respectively.

The weather protection means 258 can be a sliding roof member 260 which exits the automobile roof portion 20 of the automobile 16 and exits the automobile roof portion 120 of the automobile 116, respectively, as the windshield portion 12 is achieving the windshield portion open position 19 and when the windshield portion 112 is achieving the windshield portion open position 119, respectively.

It will be understood that each of the elements described above, or two or more together, may also find a useful application in other types of constructions differing from the types described above.

While the invention has been illustrated and described as embodied in a tiltable full vision automobile windshield, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A tiltable full vision automobile windshield, comprising:
   a) an automobile having an exterior width, a passenger compartment with an interior width, a cowl, a roof with a cross mid-pillar, and a pair of front doors with movable windows, each of said pair of front doors of said automobile having a length, a closed position and an open position, said movable windows of said pair of front doors having a closed position and an open position;
   b) a windshield portion being pivotally mounted to said cowl of said automobile and having a closed position and an open position; said windshield portion being a one piece transparent material; said windshield portion including a laterally curved and vertically rearwardly slanted front part with a pair of vertically rearwardly slanted and vertically inwardly slanted side edges, a laterally curved top edge, and a laterally curved bottom edge; and
   c) pivoting means for pivotally mounting said windshield portion to said cowl of said automobile.

2. The windshield as defined in claim 1, wherein said one piece transparent material of said windshield portion is selected from the group consisting of laminated glass and plastic.

3. The windshield as defined in claim 2, wherein said laminated glass is two sheets of glass that has sandwiched therebetween a material selected from the group consisting of plasticized polyvinyl butyryl and polyurethane sheeting.

4. The windshield as defined in claim 2, wherein said plastic is a liquid phase plastic material monomer diethylene glycol biallyl carbonate that is poured into a mold and then heated until polymerization and set.

5. The windshield as defined in claim 1, wherein said windshield portion further includes a pair of longitudinally curved and vertically inwardly slanted side parts; each of said pair of longitudinally curved and vertically inwardly slanted side parts of said windshield portion has a vertically rearwardly slanted and vertically inwardly slanted front edge, a downwardly slanted top edge, a vertically inwardly slanted back edge, and an upwardly slanted bottom edge.

6. The windshield as defined in claim 5, wherein each of said pair of longitudinally curved and vertically inwardly slanted side parts of said windshield portion extends rearwardly at said vertically rearwardly slanted and vertically inwardly slanted front edge of said pair of longitudinally curved and vertically inwardly slanted side parts of said windshield portion from a respective one of said pair of vertically rearwardly slanted and vertically inwardly slanted side edges of said laterally curved and vertically rearwardly slanted front part of said windshield portion to a distance equivalent to said length of each of said pair of front doors of said automobile; said vertically rearwardly slanted and vertically inwardly slanted front edge of each of said pair of longitudinally curved and vertically inwardly slanted side parts of said windshield portion meets said respective one of said pair of vertically rearwardly slanted and vertically inwardly slanted side edges of said front part of said windshield portion in a smoothly curved bend, so that the need for vision obstructing conventional automotive front corner pillars is eliminated since said smoothly curved bend is transparent and in itself is a reinforcement and provides roundness to said automobile for increased aerodynamic characteristics and pleasing aesthetics.

7. The windshield as defined in claim 6, wherein said windshield portion further includes a longitudinally curved roof part, said longitudinally curved roof part of said windshield portion has a laterally curved front edge, a pair of downwardly slanted side edges, and a back edge.

8. The windshield as defined in claim 7, wherein said longitudinally curved roof part of said windshield portion extends rearwardly at said laterally curved front edge of said longitudinally curved roof part of said windshield portion from said laterally curved top edge of said laterally curved and vertically rearwardly slanted front part of said windshield portion; said laterally curved front edge of said longitudinally curved roof part of said windshield portion meets said laterally curved top edge of said laterally curved and vertically rearwardly slanted front part of said windshield portion in a smoothly curved bend, so that the need for a vision obstructing conventional automotive upper front reinforcement bar is eliminated since said smoothly curved bend is transparent and in itself is a reinforcement and provides roundness to said automobile for increased aerodynamic characteristics and pleasing aesthetics.

9. The windshield as defined in claim 8, wherein said longitudinally curved roof part of said windshield portion further extends sidewardly at each of said pair of downwardly slanted side edges of said longitudinally curved roof part of said windshield portion to a respective downwardly slanted top edge of said pair of longitudinally curved and vertically inwardly slanted side parts of said windshield portion; each of said pair of downwardly slanted side edges of said longitudinally curved roof part of said windshield portion meets said respective downwardly slanted top edge of said pair of longitudinally curved and vertically inwardly slanted side parts of said windshield portion in a smoothly curved bend, so that the need for a vision obstructing conventional automotive upper side reinforcement bars is eliminated since said smoothly curved bend is transparent and in itself is a reinforcement and provides roundness to said automobile for increased aerodynamic characteristics and pleasing aesthetics.

10. The windshield as defined in claim 7; further comprising reinforcement means disposed at both said laterally curved bottom edge of said laterally curved and vertically rearwardly slanted front part of said windshield portion and at said back edge of said longitudinally curved roof part of said windshield portion, so that a rigid structural unit is provided.

11. The windshield as defined in claim 10; further comprising decorative molding disposed on said reinforcement means that are disposed at said laterally curved bottom edge of said laterally curved and vertically rearwardly slanted front part of said windshield portion and at said back edge of said longitudinally curved roof part of said windshield portion, so that said reinforcement means is decoratively hidden.

12. The windshield as defined in claim 11; further comprising thin decorative molding disposed on said vertically inwardly slanted back edge of said pair of longitudinally curved and vertically inwardly slanted side parts of said windshield portion and thin transparent molding disposed on said upwardly slanted bottom edge of each of said pair of longitudinally curved and vertically inwardly slanted side parts of said windshield portion, so that vision is not obstructed.

13. The windshield as defined in claim 5, wherein each of said movable windows of said pair of front doors of said automobile is triangular-shaped and has a vertically rearwardly slanted and vertically inwardly slanted front edge; each said vertically rearwardly slanted and vertically inwardly slanted front edge of said triangular-shaped movable windows of said pair of front doors of said automobile meets a respective upwardly slanted bottom edge of said pair of longitudinally curved and vertically inwardly slanted side parts of said windshield portion when said windshield portion is in said closed position and when said triangular-shaped movable windows of said pair of front doors of said automobile are in said closed position and when said pair of front doors of said automobile are in said closed position, so that a full side vision area is provided.

14. The windshield as defined in claim 10, wherein said pivoting means includes hinges that are mounted to said reinforcement means that is disposed at said laterally curved bottom edge of said laterally curved and vertically rearwardly slanted front part of said windshield portion and to said cowl of said automobile; said windshield portion pivots upwardly about said hinges in the range of 25 to 35 degrees to a point where said upwardly slanted bottom edge of said pair of longitudinally curved and vertically inwardly slanted side parts of said windshield portion reach the position where the eliminated vision obstructing conventional automotive front corner pillars would have been, so that sufficient space is provided for entering and leaving said automobile; said pivoting means further includes counterbalancing means, so that said windshield portion is pivoted more easily and is prevented from unintentional movement.

15. The windshield as defined in claim 7; further comprising an extension that extends horizontally forwardly from said cross mid-pillar of said roof of said automobile towards said laterally curved and vertically rearwardly slanted front part of said windshield portion, so that said longitudinally curved roof part of said windshield portion rests on said extension and provides a rigid reinforcement to further improve safety characteristics when said windshield portion is in said closed position of said windshield portion.

16. The windshield as defined in claim 15, wherein said longitudinally curved roof part of said windshield portion is separate from said windshield portion and is selected from the group consisting of glass, plastic, sheet metal, a sun roof, and said extension.

17. The windshield as defined in claim 1; further comprising weather protection means for protecting a user during inclement weather when said windshield portion is achieving said open position; said weather protection means covers the space between said roof portion of said automobile and said windshield portion.

18. The windshield as defined in claim 17, wherein said weather protection means includes a sliding roof member which is slidably mounted in said roof portion of said automobile and is extendable therefrom as said windshield portion is achieving said open position and retractable therein as said windshield portion is achieving said closed position.

* * * * *